United States Patent [19]

Hegg

[11] Patent Number: 5,245,472
[45] Date of Patent: Sep. 14, 1993

[54] HIGH-EFFICIENCY, LOW-GLARE X-PRISM
[75] Inventor: Ronald G. Hegg, Los Angeles, Calif.
[73] Assignee: Hughes Aircraft Company, Los Angeles, Calif.
[21] Appl. No.: 721,725
[22] Filed: Jun. 26, 1991
[51] Int. Cl.⁵ .......................... G02B 5/30; G02B 27/28
[52] U.S. Cl. ..................... 359/496; 359/583; 359/629
[58] Field of Search ............... 359/464, 465, 487, 496, 359/630, 633, 409, 498, 583, 629

[56] References Cited

U.S. PATENT DOCUMENTS

| | | | |
|---|---|---|---|
| 2,388,858 | 11/1945 | MacNeille et al. | 359/465 |
| 2,449,287 | 9/1948 | Flood | 359/496 |
| 2,669,901 | 2/1954 | Rehorn | 359/465 |
| 3,510,198 | 5/1970 | Pace | 359/496 |
| 4,647,966 | 3/1987 | Phillips et al. | 359/72 |
| 4,902,116 | 2/1990 | Ellis | 359/630 |
| 4,969,714 | 11/1990 | Fournier, Jr. et al. | 359/630 |
| 4,973,132 | 11/1990 | McDonald et al. | 359/630 |
| 5,074,645 | 12/1991 | Gold et al. | 359/498 |

FOREIGN PATENT DOCUMENTS

WO85/04961 11/1985 PCT Int'l Appl. .................. 359/13

*Primary Examiner*—Martin Lerner
*Attorney, Agent, or Firm*—L. A. Alkov; W. K. Denson-Low

[57] ABSTRACT

A high efficiency x-prism beamsplitter for use in such applications as helmet mounted visor displays. By using polarization-sensitive dielectric coatings arranged along with half-wave plates, the x-prism can theoretically deliver 50% illumination to each eye with no loss. In addition to the higher efficiency, the glare throughput found in conventional x-prisms can be theoretically reduced to zero.

3 Claims, 2 Drawing Sheets

HIGH-EFFICIENCY, LOW-GLARE X-PRISM

BACKGROUND OF THE INVENTION

The present invention relates to optical beam-splitters, and more particularly to an improved x-prism beamsplitter.

Beamsplitters are optical elements used in a wide variety of optical devices and systems. One type of beamsplitter is the x-prism. One exemplary type of optical system employing an x-prism is the helmet visor display.

A problem with conventional visor display apparatus is the lack of brightness which might limit the usefulness of the display in daytime or near-dusk conditions. A conventional helmet visor display is illustrated in FIG. 1, and employs a cathode ray tube 20 (CRT) which generates an image which is passed through a lens 22 and split by an x-prism 24 into an image for both eyes. Fold mirrors 34A, 34B and optical combiners 36A, 36B are employed to redirect the image light from the x-prism 24 to the wearer's left and right eyes. The function of the fold mirrors 34A, 34B is simply to redirect the light from the x-prism toward the combiners 36A, 36B. The function of each combiner 36A, 36B is two-fold: (1) to collimate the image made from the CRT 20 and lens 22 so that the virtual image appears at optical infinity; and (2) to act as a beam-splitter so that the CRT image may be overlaid with the outside scene. The combiner is actually a mirror/visor combination in a typical helmet visor display.

The conventional x-prism 24 is composed of four pieces of glass 26, 28, 30, 32 with a metal or dielectric coating on one side of each piece. These four pieces are bonded together to form an "X." Light entering the cube is split four ways, 25% to the right and the left, and 25% up and down. The light going up and down is wasted.

A conventional x-prism employs 50%/50% beamsplitter coatings, but since the rays from the CRT 20 must pass through these coatings twice before reaching the eye, the maximum theoretical efficiency is only 25% and typically the actual prisms are only 15% efficient. This low efficiency is due to the fact that if metal coatings are used for the conventional x-prism, there is considerable absorption; for dielectric coatings, the efficiency is tempered by the need for a wide angular bandwidth.

Another problem presented by helmet visor displays employing a conventional x-prism beamsplitter is glare. In normal day environment, light leaking up through the visor from one eye's side can pass through the x-prism and end up reflecting into the other eye, possibly washing out the scene. Here again, since light entering the cube from any face is split evenly into fourths, the 25% of the glare from one side (not counting other optical component losses) will end up at the other side of the visor display (see FIG. 2).

It is therefore an object of this invention to provide an x-prism with improved efficiency.

Another object is to provide an x-prism with improved glare characteristics.

SUMMARY OF THE INVENTION

A polarization x-prism beamsplitter is described, and comprising four similar right-angle triangular prism subassembly elements, typically formed of glass. Each triangular subassembly element is characterized in that each has formed on one leg a polarization sensitive coating which predominately reflects the "s" polarization incident light and transmits the "p" polarization light, and on another leg a half wave plate is formed which converts the polarization of the light incident thereon. The four triangular elements are bonded together to form an "x" with their respective legs joined such that a coating is next to a half-wave plate.

In the exemplary embodiment, the coating comprises a MacNeille type dielectric coating.

Since the polarization x-prism can be manufactured from the same glass material as the conventional x-prism, such a prism can be retro-fitted into existing visor displays.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 3:
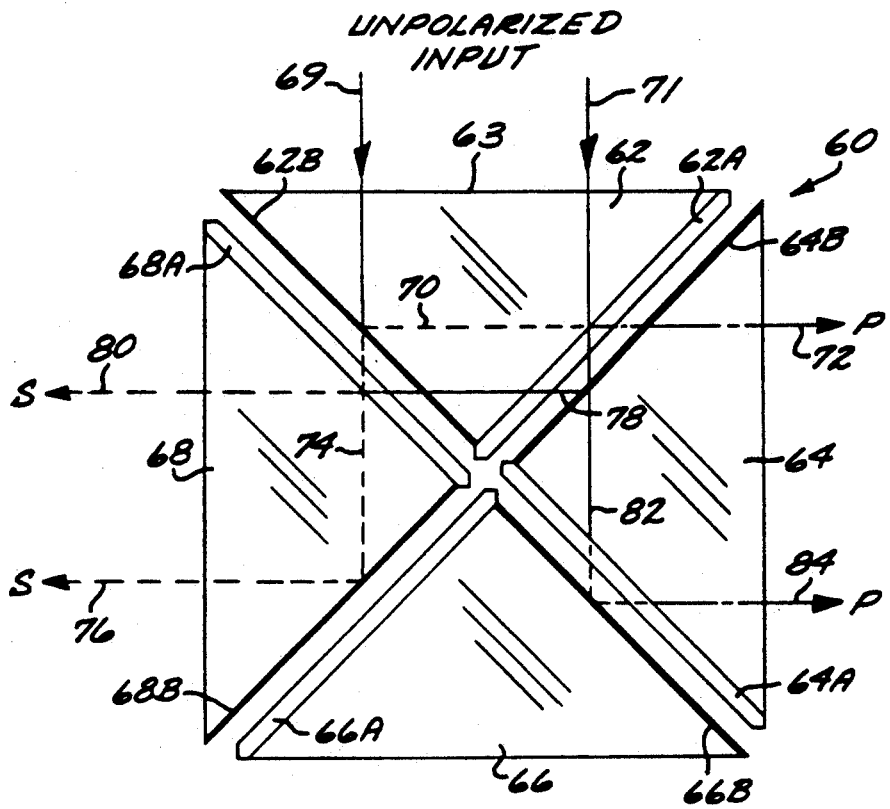
FIG. 3 illustrates of an x-prism embodying the invention.
Figure 4:
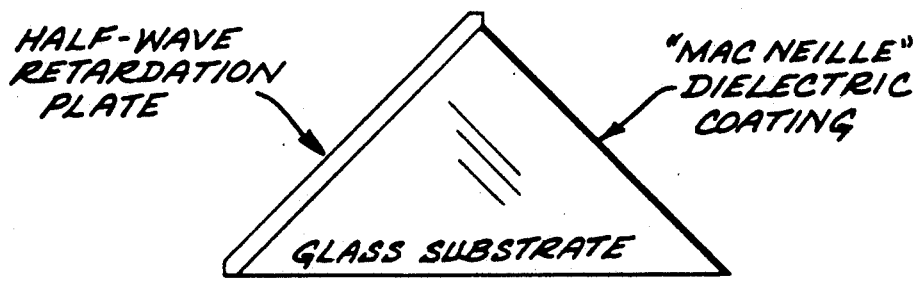
FIG. 4 illustrates a sub-assembly for an x-prism embodying the invention.

The efficiency and glare problems of the conventional x-prism can be solved with a polarization x-prism in accordance with the invention. Referring to FIGS. 3 and 4, the x-prism 60 comprises four similar right-angle triangles 62, 64, 66 and 68, each having a "MacNeille" type dielectric coating formed on one leg and a half-wave plate (tuned to 540 nm) bonded to the other leg. Thus, the respective legs carrying the coating and half-wave plate meet to define a right angle.

A "half-wave plate" is a specific type of optical retarder. In general an optical retarder causes one of the polarizations of a beam of light to lag in phase behind the other. Upon emerging from the retarder, the relative phase of the two components is different than it was initially and, thus, the polarization is different as well. Specifically, a half-wave retarder introduces a relative phase difference of $\pi$ radians or 180° between the two waves. This has the effect of changing one polarization into another (i.e., "p" into "s" and "s" into "p"). See Optics, by Hecht and Zajac, 1976, pp. 246-248.

In order to make one state lag behind the other, the material must have two different optical indices in the two directions. Such a material is called birefringent.

As it turns out, actual materials that are used to make retarders are sensitive both to thickness and wavelength. Therefore, a specific thickness of material will be a half-wave plate for a specific wavelength. In the case of an exemplary helmet visor display, which is basically monochromatic, the light is centered around 543 nm which is the main peak of the CRT phosphor (P43), and hence the half-wave plate is tuned to about this wavelength.

A half-wave plate is usually made from a thin slice of mica which is cleaved from the crystal. It can have a minimum thickness of about 60 microns. Therefore, in order to make a half-wave plate, the thickness of the material must conform to the following equation:

$$d(nO - ne) = (2m+1)\lambda/2$$

where
d = the thickness along the ray
nO, ne = the order (0,1,2,3, . . .)
$\lambda$ = the wavelength of light Mica has an index of 1.599 and 1.594. Therefore, if the 0th order is chosen along with the wavelength of 0.543 microns, the thickness works out to be 108.60 microns. Now since the material is actually situated 45° relative to the nominal input beam, the thickness of the plate would be only 76.79 microns.

The "MacNeille" type coating is a polarization-sensitive coating characterized in that incident "s" polarization light is predominately reflected and the incident "p" polarization light is transmitted. MacNeille type coatings are described, for example, in the "Handbook of Optics," Walter G. Driscoll, Ed., 1978, at pages 8-74 and 8-75.

The four triangular elements 62, 64, 66 and 68 are typically made of glass, although other lens materials such as plastics may also be used. Schott SF6 or SFL6 is the type of glass typically used since it has a high index (~1.8). High index glass works best for a wide FOV visor display. For a narrower FOV display, other glasses such as Schott BK7 (index ~1.52) can be used. An advantage is that the x-prism 60 may be fabricated of the same glass material as a conventional x-prism in an existing optical system such as a helmet visor display, so that the new x-prism can directly replace the conventional x-prism in the existing system.

The four triangular elements are bonded together as shown in FIG. 3 with the legs joined such that a coating is next to a half-wave plate. An index-matching adhesive is used to bond the elements together.

Figure 1:
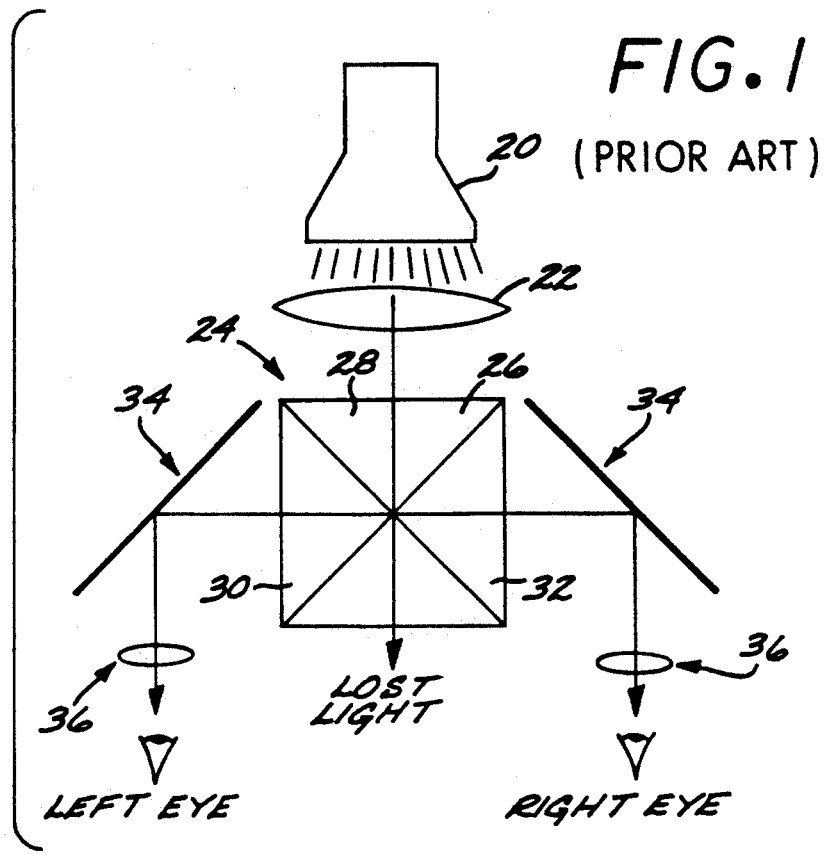
FIG. 1 is a schematic diagram illustrative of a conventional x-prism in a helmet visor display.

Assume now that the polarization x-prism 60 has been installed in the helmet visor display of FIG. 1 in place of the conventional x-prism 24. By taking advantage of the fact that the light from the CRT 20 is unpolarized light, composed of equal parts of "s" and "p" polarized light, the x-prism 60 splits the polarization light components apart, sending one to the left and the other to the right with theoretically no loss. Each eye could receive one-half of the illumination. Therefore, helmet visor displays equipped with this polarization x-prism could be 100% brighter than with a conventional x-prism.

When unpolarized light is incident on face 63 of triangle 62, the "s" polarization comprising incident ray 69 on the left side is reflected to the right (ray 70). This light passes through the half-wave plate 62A, is converted to "p" polarized light and is transmitted through the right side coating 64B of triangle 64 and out of the prism (exit ray 72). The "p" polarized light component of ray 69 entering on the left side passes through the left side coating 62B as ray 74, is converted to "s" polarization light by means of the half-wave plate 68A of triangle 68 and reflects off the bottom-left coating 68B to the left as exit ray 76.

The unpolarized light entering the prism 60 from the right side of triangle 62 as ray 71 passes through the half-wave plate 62A of the triangle 62 where the "s" polarized light component is reflected to the left (ray 78), passes through the half-wave plate 62A and is converted to "p" polarized light, which passes through the coating 62B of triangle 62, is converted to "s" polarized light through the half-wave plate 68A and emerges from the prism 60 as exit ray 80. The "p" polarized light (ray 82) that is remaining is converted into "s" polarized light by the bottom right half-wave plate 64A, reflected from the bottom-right coating 66B, is converted back to "p" polarized light by the half-wave plate 64B and emerges from the x-prism on the right side as exit ray 84.

With such a polarization prism, virtually no light will pass straight through the cube producing both an efficient x-prism and a low-glare source. However, such a coating is only theoretically 100% efficient at 0° incidence angle. The incidence angle is the angle of the incident ray with respect to the normal to the face of the prism. For example, ray 69 is parallel (0° incidence) to the normal of the face 63 of prism 62. At other angles, this efficiency falls off. In fact, the efficiency can be expressed as the following equation:

$$eff = (R_s T_p + R_p T_s)/2$$

where
$R_s$ = % Reflection of "s"
$R_P$ = % Reflection of "p"
$T_s$ = % Transmission of "s"
$T_p$ = % Transmission of "p"

If $R_s$ and $T_P$ are 100%, the efficiency will be 50%. However, for $R_s$ and $T_p$ equal to 80% (and $R_p$ and $T_s$ equal to 20%), the efficiency drops to 34%. Nevertheless, this is still over two times better than the specified 15% efficiency of the conventional x-prism.

Using such a definition of efficiency, the proper "MacNeille" coating can be designed with the following exemplary quarter-wave stack information. The quarter-wave stack of any interference dielectric coating is a preferred thickness and structure whether two materials (designated by H and L referring to the high and low index material), are layered alternately so their effective optical thickness is a quarter of the wavelength of the nominal light radiation. A certain set of HL quarter-wave layers can be so configured to give a "MacNeille" coating.

Glass (HL) 4(LH) 12 Glass where:
Index of Glass = 1.815 (SFL6 Schott Glass)
H = 2.1
L = 1.62

With such a stack, Table 1 shows how the efficiency and glare of the x-prism fared over the angular bandwidth of a wide field-of-view (FOV) visor display. Such a coating produced an angular bandwidth of about 42° (corresponding to the FOV of the visor display with a 1:1 pupil magnification) with an efficiency greater than 35%. Such a prism is twice as efficient as current x-prisms.

TABLE I

| Angle in Glass wrt Coating | Angle in Air wrt Coating | Refl "P" | Refl "P" | Trans. "P" | Trans "S" | Eff. | Glare |
|---|---|---|---|---|---|---|---|
| 25.00° | −38.37 | 8.50% | 18.84% | 91.50% | 81.16% | 12.07% | 37.93% |
| 30.00° | −28.02° | 0.20% | 8.86% | 99.80% | 91.32% | 4.42% | 48.58% |
| 35.00° | −18.37° | 5.54% | 85.24% | 94.46% | 24.76% | 40.67% | 9.33% |
| 40.00° | −9.10° | 6.94% | 100.00% | 93.06% | 0.00% | 45.53% | 3.40% |
| 45.00° | 0.00° | 0.00% | 99.90% | 100.00% | 0.10% | 49.95% | 0.05% |
| 50.00° | 9.10° | 17.16% | 100.00% | 82.84% | 0.00% | 41.42% | 8.58% |
| 55.00° | 18.37° | 29.24% | 100.00% | 70.76% | 0.00% | 35.38% | 14.62% |
| 60.00° | 28.02° | 29.16% | 81.82% | 70.84% | 18.18% | 31.63% | 18.37% |
| 65.00° | 38.37° | 35.98% | 20.62% | 64.02% | 79.38% | 20.88% | 29.12% |

Since this x-prism can be manufactured from the same glass material as the conventional x-prism, such a prism can be retro-fitted into existing visor displays. Moreover, by using an x-prism that is polarization sensitive, the coating on the visor combiner comprising the helmet visor display need only reflect efficiently for one polarization, which can mean an improved performance from the visor standpoint.

Figure 2:
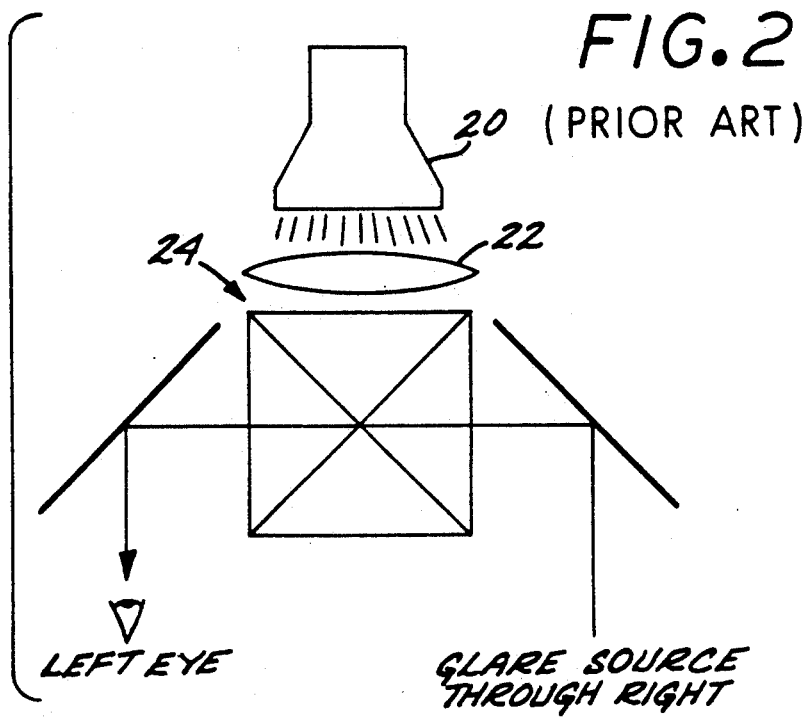
FIG. 2 is a schematic diagram illustrative of the glare problem resulting from use of a conventional x-prism in a helmet visor display.

Another advantage of the polarization x-prism is the reduction in glare. Any stray light will be reflected up or down, and will therefore be blocked from passing directly to the other eye, in contrast to the operation of the conventional x-prism, as shown in FIG. 2.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed:

1. A high-efficiency, low glare helmet mounted display for achieving relatively high efficiency light transmission to each eye of the helmet wearer, comprising:
an image display source mounted on said helmet for generating unpolarized image light comprising equal parts of "s" and "p" polarized light;
beamsplitter means for dividing said image light into right and left image light components for respective eyes of a helmet wearer, comprising a polarization x-cube prism beamsplitter comprising four triangular prism subassembly, elements each having two legs which meet at substantially a right angle, characterized in each element has formed directly on one said leg a MacNeille type dielectric polarization sensitive coating which predominantly reflects the "s" polarization incident light and transmits the "p" polarization light, said display is a wide field-of-view display, said coating is turned to provide reduced efficiency in order to provide an increased angular bandwidth and said coating is turned to provide an angular bandwidth of at least 40° while providing an efficiency of at least 35%, where the efficiency is determined by the relationship efficiency $= (R_s T_p + R_p T_s)/2$ and Rs = % reflection of "s" polarized light, Rp = % reflection of "p" polarized light, Ts = % transmission of "s" polarized light and Tp = % transmission of "p" polarized light and formed directly on the other of said legs a half wave plate is formed which converts the polarization of the light incident thereon, and wherein said four triangular elements are bonded together with their respective legs joined such that a coating formed on a leg of a triangular element is next to a half-wave plate formed on an adjacent leg of another said triangular element; and
means for redirecting said right and left image light components toward the wearer's eyes.

2. The helmet mounted display of claim 1 wherein said triangular elements are formed of glass.

3. The helmet mounted display of claim 1 wherein the legs of each triangular prism element which carry said respective coating and plate define a right angle.

* * * * *